United States Patent
Abella et al.

(10) Patent No.: US 6,192,110 B1
(45) Date of Patent: *Feb. 20, 2001

(54) METHOD AND APPARATUS FOR GENERATING SEMATICALLY CONSISTENT INPUTS TO A DIALOG MANAGER

(75) Inventors: Alicia Abella, Scotch Plains; Allen Louis Gorin, Berkeley Heights, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/943,944

(22) Filed: Oct. 3, 1997

Related U.S. Application Data

(63) Continuation-in-part of application No. 08/528,578, filed on Sep. 15, 1995, now Pat. No. 5,675,707.

(51) Int. Cl.⁷ .................................................. H04M 3/493
(52) U.S. Cl. ........................................ 379/88.01; 704/251
(58) Field of Search ............................... 379/88.01, 88.03, 379/88.04, 201, 210, 211, 212, 213, 214, 111, 112, 114; 270/251, 270, 275

(56) References Cited

U.S. PATENT DOCUMENTS

| 5,666,400 | * | 9/1997 | McAllister et al. | 379/67 |
| 5,719,921 | * | 2/1998 | Vysotsky et al. | 379/88 |
| 5,905,774 | * | 5/1999 | Tatchell et al. | 379/88.04 |

* cited by examiner

*Primary Examiner*—Scott L. Weaver

(57) ABSTRACT

A spoken dialog system is constructed to sufficiently understand a user's response to the open-ended prompt 'How may I help you?' in order to route a caller to an appropriate destination, with subsequent processing for information retrieval or call/task completion. In this invention the relationships among the call types are structured into an inheritance hierarchy. Then a dialog manager exploits this hierarchy and the output of a spoken language understanding module to generate a set of semantically consistent task objectives.

30 Claims, 5 Drawing Sheets

| BC<br>A | 00 | 01 | 11 | 10 |
|---|---|---|---|---|
| 0 | 000 | 001 | 111 | 110 |
|   | 000 | 001 | 011 | 010 |
| 1 | 110 | 111 | 111 | 110 |
|   | 100 | 101 | 111 | 110 |

| BC<br>A | 00 | 01 | 11 | 10 |
|---|---|---|---|---|
| 0 | 0 | 0 | 1 | 0 |
| 1 | 0 | 1 | 1 | 0 |

METHOD AND APPARATUS FOR GENERATING SEMATICALLY CONSISTENT INPUTS TO A DIALOG MANAGER

This application is a continuation-in-part of U.S. patent application Ser. No. 08/528,578 is now U.S. Pat. No. 5,675,707, filed Sep. 15, 1995, and granted Oct. 7, 1997.

BACKGROUND OF THE INVENTION

1. Field of Invention

The present invention relates to a dialog system and method that interprets a user's requests and implements one or more task objectives.

2. Description of Related Art

There exists a large number of spoken dialog systems whose dialog managers differ in the strategies they employ, in the way they represent and manipulate task knowledge and in how much initiative they take. It is often the case that a user's utterance needs clarification either because the user has supplied too much information or not enough. Existing dialog managers have problems when there are ambiguities in the user's utterances or if the user indicates a desire to implement more than one objective.

A need exists for a dialog manager that infers the user's intention, detects the presence of ambiguities based on the task knowledge, constructs a semantically consistent representation of the user's intention, and logically implements the users objective.

SUMMARY OF THE INVENTION

A dialog manager system and method employs dialog strategies to engage a user in a dialog if necessary in order to implement task objectives. This strategy is based on a prioritized hierarchy of task-types by determining a semantically consistent set of task objectives from a user's input.

The system and method uses an inheritance hierarchy of call or task-types (services). This hierarchy is used by the dialog manager to generate a semantically consistent combination of call or task-types in the form of a Boolean formula. The Boolean formula is then used by the dialog manager to determine if it is necessary to ask clarifying questions, ask for further information required to complete the transaction and determine in what order to ask such questions. This formula is attained through a Boolean formula minimization process and always yields a minimal and consistent combination of call or task-types. Furthermore, a change in the hierarchy does not require changing the dialog manager.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

The disclosed system and method have many uses in various industries. The dialog manager may be used in any situation and with any system, known or developed in the future, where a machine must interact with a human. However, in the way of an illustrative example, the invention will be applied to a telephone system, as set forth below.

Figure 1:
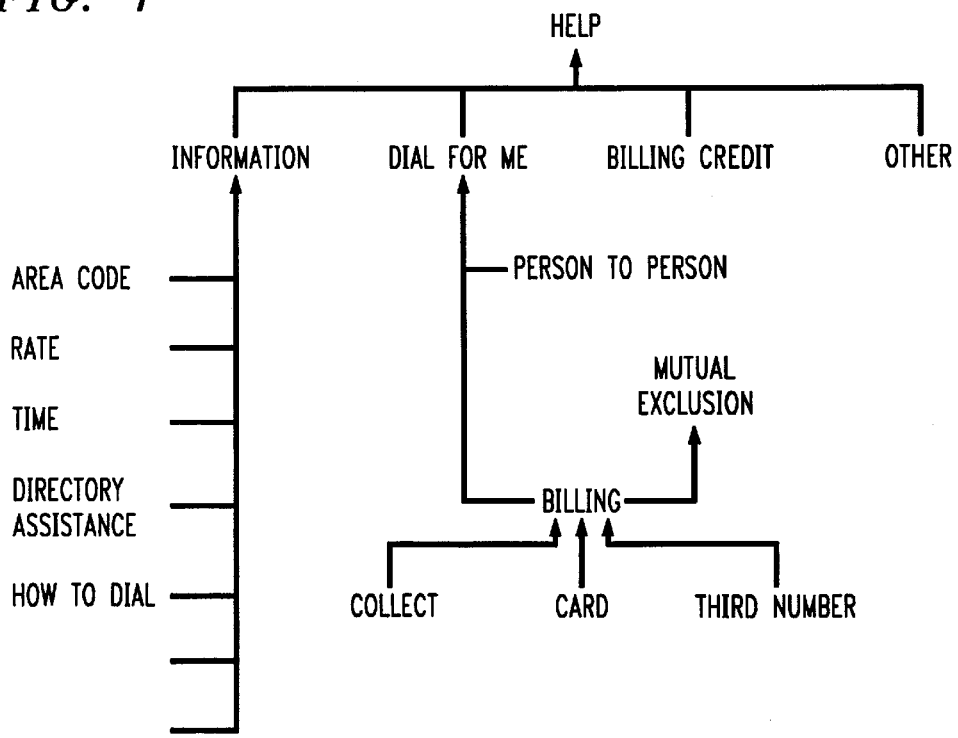
FIG. 1 illustrates the inheritance hierarchy for a subset of call types.

The relationship among the call types and auxiliary concepts (shown in boldface) is illustrated in the inheritance hierarchy of FIG. 1. A user's utterances are analyzed to determine possible call routing objectives, which are classified into one or more call types out of 15, for example, (a subset is illustrated in FIG. 1). If the user's utterances cannot be classified after dialog is conducted between the user and the system, the user is sent to a human agent (OTHER) for clarification. The call types are subdivided into three categories, INFORMATION, DIAL-FOR-ME, BILLING CREDIT and the additional OTHER. The prior art of dialog management does not take advantage of the relationships among call types in this manner. This new approach utilizes this hierarchy to generate the semantically consistent combination of call types that are representative of the caller's request.

Figure 2:
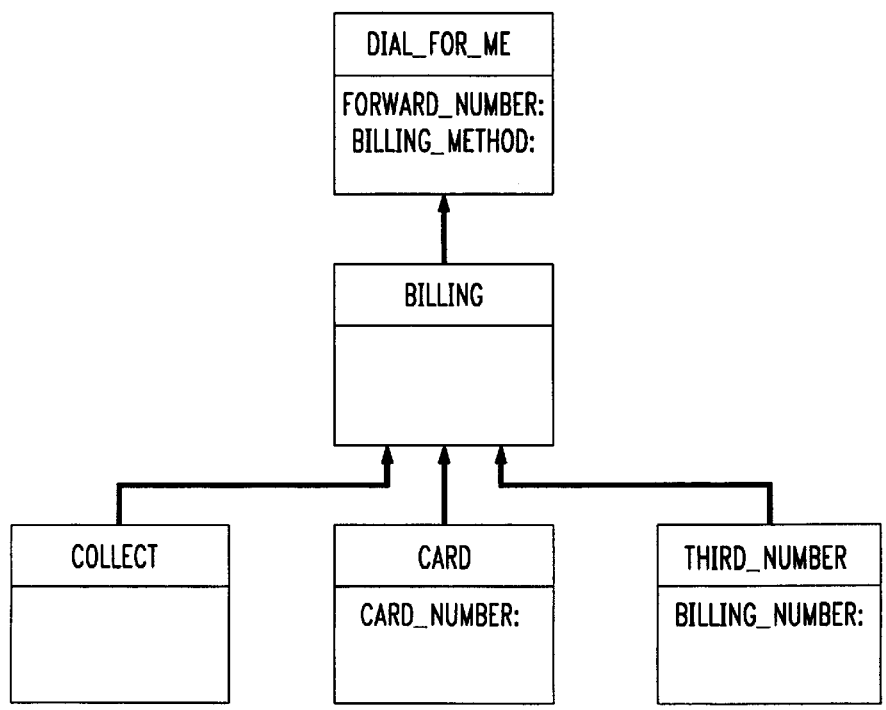
FIG. 2 illustrates an example of call types and their associated attributes.

Each call type is represented as a class. Each class may have attributes associated with it that describe the class. These attributes may be specific to the class or may be inherited from other classes. FIG. 2 illustrates an example of several call types such as, DIAL-FOR-ME, BILLING, CARD, COLLECT, and THIRD-NUMBER. As shown in the drawing, since DIAL-FOR-ME is an ancestor class of BILLING and BILLING is in turn an ancestor class of CARD, COLLECT, and THIRD-NUMBER, they each inherit the forward_number attribute from DIAL-FOR-ME. In addition, CARD has card_number and THIRD-NUMBER has billing_number. Since COLLECT only requires the forward_number it needs no additional attributes.

The hierarchy operates to prioritize various call types which, depending on the priority of the call type in the hierarchy, may result in the following scenarios: conjunctive, mutually exclusive, superseding, unsolicited information, and context switch scenarios.

A conjunctive scenario occurs when the system determines that the caller wants to implement two or more call types belonging to two unrelated branches of the inheritance hierarchy, which implies that the caller wants the system to satisfy both of his/her requests. Each call type has associated with it a priority. The hierarchy can encode a prioritization of the call types which can be used by the dialog manager to determine which one to satisfy first. For example in FIG. 1, informational requests have the highest priority and are therefore satisfied first.

A mutually exclusive scenario occurs when the system determines that the caller wants to implement two or more call types that belong to two related branches of the inheritance hierarchy, such that it is only possible to implement one of the objectives. In this scenario, the caller is asked to clarify his or her desired routing objective.

A superseding scenario occurs when the system determines that the caller wants to implement two or more call types, as in the conjunctive scenario. However, because one call type is an ancestor of another call type (descendent), it is implied that the descendent supersedes its ancestor. This inheritance structure is exploited to focus the dialog on the descendent call type since it is more specific.

A confirmation scenario occurs when the system determines the need to verify the callers intention because the system's confidence level was not high enough. However, it is often not necessary for the system to ask the caller to repeat his or her request, but rather to verify the information that was provided in the initial utterance.

A context switch occurs when the caller or the Spoken Language Understanding module makes a mistake and then repairs it, for example. The caller will utter a valid response, the system will provide a response in the form of a verifying question. The caller then answers the verifying question in the negative and then adds that he or she wants to implement a different call type with a correspondingly different priority. The system will then process the second response and ask a verification question based on that utterance.

The above scenarios are exemplary in nature. Many other situations may exist to exploit the inheritance hierarchy of this invention. To further illustrate how the inheritance hierarchy is used in these scenarios, several examples are set forth below.

Figures 3, 4, 5:
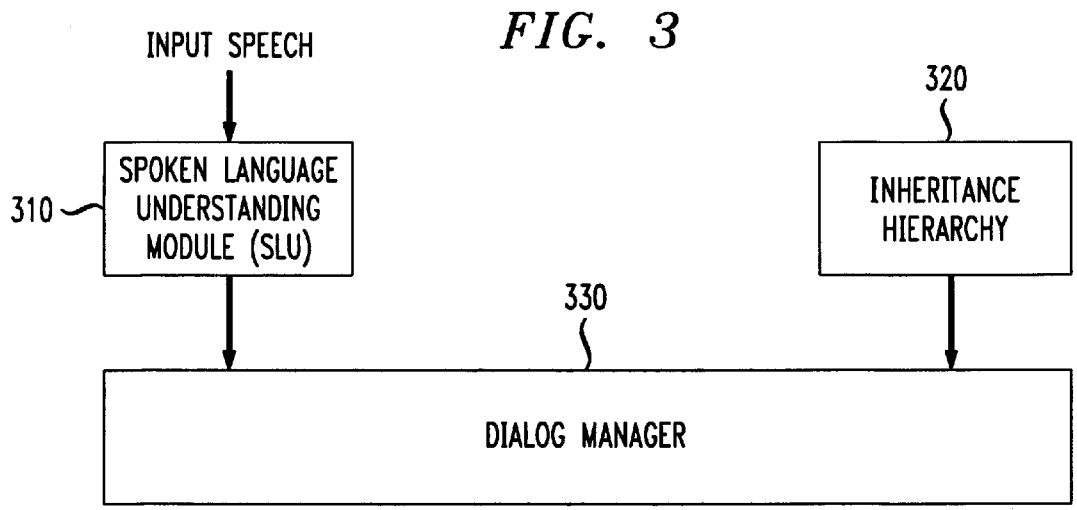
FIG. 3 is a block diagram of the dialog manager of the invention.
FIG. 4 illustrates initial bit strings representing the values of the variables for each cell.
FIG. 5 illustrates the result of applying Boolean formula minimization.

FIG. 3 describes how the dialog manager uses the Spoken Language Understanding module (SLU) output and the inheritance hierarchy of the invention. The SLU module 310 receives input speech from a recognizer and associates the recognized speech with any one or more of a number of task objectives. The SLU module 310 compiles a list of task objectives based on the recognized input speech and assigns a score associated with the probability that the user wants a particular task objective implemented. The method of recognizing speech and assigning a score relating to the probability of implementing a task objective based on recognized speech can be accomplished by any method known to one skilled in the art, including the method disclosed in U.S. patent application No. 08/528,578 now U.S. Pat. No. 5,675,707 granted Oct. 7, 1997 which is incorporated herein by reference.

The list of task objectives and their associated scores are input by the SLU module 310 into the dialog manager 330. The dialog manager 330 applies a threshold to the list of task objectives in order to determine the most probable one or more task objectives the user may wish to implement. The threshold applied may be predetermined or computed, for example. If none of the task objectives on the list of task objectives meets the threshold, the dialog manager 330 will direct that the user be asked a clarifying question (e.g., "The system did not understand your response. Please try again").

Once the threshold has been applied, the list of probable task objectives is then subjected to an inheritance hierarchy 320, such as the one shown in FIG. 1 and described above. The next section describes how the dialog manager 330 exploits the above inheritance hierarchy 320 and task knowledge using several examples.

When the user utters a request, the recognizer passes its result to the SLU module 310 which produces a set of call types with the ranked probabilities that a caller wanted each of the various services. The following examples illustrate the dialog manager's utilization of the inheritance hierarchy 320 together with the SLU module 310 to produce a Boolean formula. The Boolean formula is used by the dialog manager to generate a response.

Conjunctive Scenario

User: I would like to make a person-to-person call to Tokyo but can you tell me what time it is there now?

SLU output: {(PERSON-TO-PERSON, 0.97), (TIME, 1.00)}
Boolean formula: TIME AND PERSON-TO-PERSON
System: It is currently 11 A.M. How would you like to bill this call?

In this example the dialog manager 330 examines the inheritance hierarchy 320 to find that the two call types returned by the SLU module 310 belong to two unrelated branches of the inheritance hierarchy, which implies that the caller wishes the system to fulfill both of his or her requests. Since each call type has associated with it a priority, the highest priority call types are satisfied first. In this example, TIME, which is a descendant of INFORMATION is processed first. The dialog manager 330 then proceeds to process the PERSON-TO-PERSON request which first requires eliciting the billing method.

Mutually Exclusive Scenario

User: I would like to charge this call.
SLU output: {(THIRD-NUMBER, 0.75), (CARD, 0.24)}
Boolean formula: THIRD-NUMBER OR CARD
System: How would you like to bill this call?

In this example it is necessary for the dialog manager 330 to initiate a clarification dialog to determine which billing method to apply. Again the dialog manager 330 examines the inheritance hierarchy 320 to find that these call types are mutually exclusive since there can only be one billing method. The relation of mutual exclusion is implemented by introducing the concept of MUTUAL EXCLUSION as an ancestor of BILLING, as shown in FIG. 1.

Superseding Call Scenario

User: I'm trying to make a calling card call can you help me dial it?
SLU output: {(DIAL-FOR-ME, 0.78), (CARD, 0.96)}
Boolean formula: CARD
System: May I have your card number, please?
User: 000-123-4567-000
System: What number would you like to call?

In this example, it was not necessary for the dialog manager 330 to ask for the billing method, which would be the case if only the call type DIAL-FOR-ME had been returned. Instead it can go ahead and ask for the calling card number and phone number because DIAL-FOR-ME is an ancestor of CARD which implies that CARD supersedes DIAL-FOR-ME. Each attribute of a call type has an associated priority. This priority between attributes is different than the priority between call types and is used to determine which attribute to ask about first. For the CARD call type the attribute card number has a higher priority than phone number and therefore is asked about first.

Confirmation Scenario

User: Yes operator I'm trying to dial 123 4567 but I can't get through.
SLU output: {(DIAL-FOR-ME, 0.84)}
Boolean formula: (DIAL-FOR-ME)
System: Would you like to make a call?
User: Yes.
System: May I have that number again?
User: 555 4567

In this example, it was necessary to verify that the user wanted to make a call since the confidence was not high enough. However, it was not necessary to explicitly ask the user What number would you like to call? but rather only to verify the phone number that was provided in the initial utterance.

Context Switch Scenario

User: Um uh can I make a collect call?
SLU output: {(COLLECT, 0.80)}
Boolean formula: (COLLECT)
System: Would you like to make a collect call?
User: No no charge it to my calling card.
SLU Output: {(CARD, 0.85)}
Boolean formula: (CARD)
System: Would you like to make a card call?
User: Yes.

It is very useful for the system to be able to handle a context switch especially if the user has made a mistake and wishes to repair it, which is the case in this example.

The Boolean formula minimization algorithm for generating the minimal and consistent combination of call types eliminates the often complex coding of if . . . then rules that often accompany dialog managers 330. The dialog manager 330 of the invention is data driven, it is provided with the inheritance hierarchy 320 and it applies the Boolean formula minimization algorithm. If we change the inheritance hierarchy 320 we do not have to create a new dialog manager 330. Another advantage of this data driven approach is in its ability to facilitate portability to other applications. To use the dialog manager 330 for a different application requires creating a new inheritance hierarchy 320 but not a new dialog manager 330.

We will describe the algorithm for generating the Boolean formula via an example:
User: I would like to charge a person-to-person call.
SLU Output: {(THIRD-NUMBER, 0.67), (CARD,0.25), (PERSON-TO-PERSON,0.97)}
Boolean formula: (PERSON-TO-PERSON AND THIRD-NUMBER) OR (PERSON-TO-PERSON AND CARD)
System: How would you like to bill this call?

From the inheritance hierarchy 320, the system knows that CARD and THIRD-NUMBER are mutually exclusive and that PERSON-TO-PERSON can be performed in conjunction with either of these two call types. As a result, the semantically consistent combination of call types is (PERSON-TO-PERSON AND THIRD-NUMBER) OR (PERSON-TO-PERSON AND CARD). The dialog manager 330 maps the initial interpretation to an interpretation based on the inheritance hierarchy 320 and uses this to determine which of its dialog strategies to apply. The initial interpretation, which is PERSON-TO-PERSON AND THIRD-NUMBER AND CARD, is mapped into an ambiguous interpretation based on the inheritance hierarchy 320 since THIRD-NUMBER AND CARD can not coincide. The dialog manager 330 then knows to apply a disambiguation strategy to prompt the user to specify the billing method. Unlike an example that would require eliciting missing information this scenario is an ambiguous one because the SLU module 310 has provided two billing methods, as opposed to none.

Figure 6:
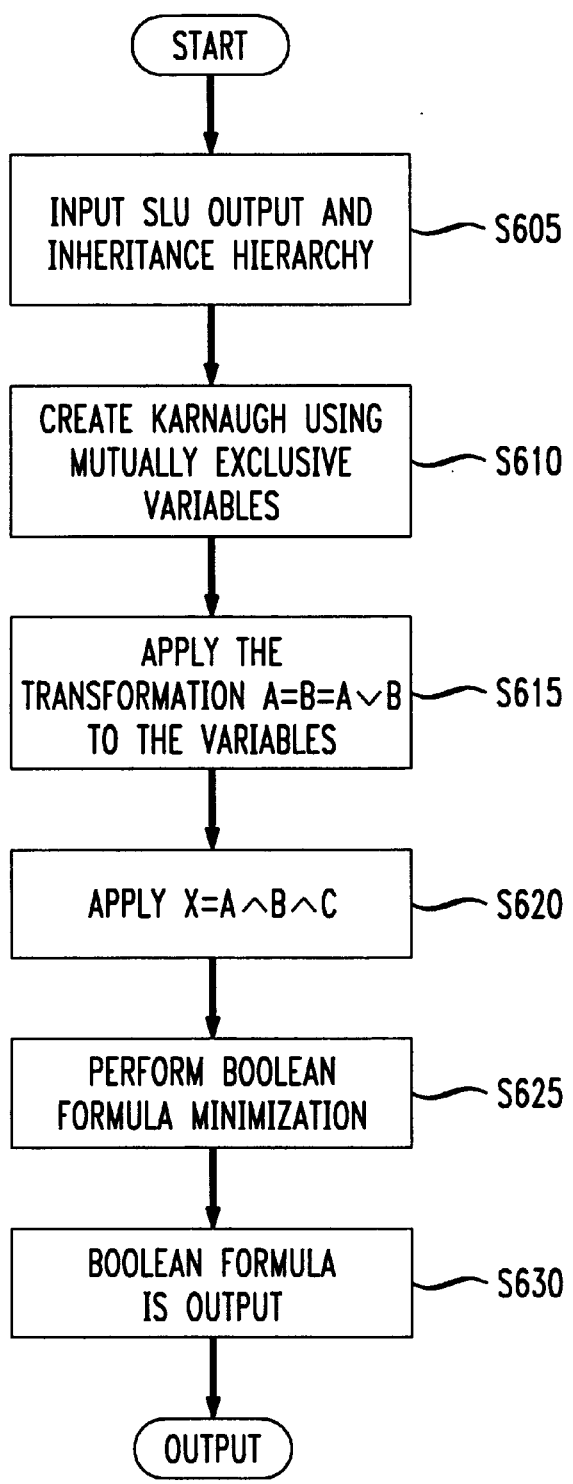
FIG. 6 is a flow diagram of one of the algorithms used by dialog manager.

In general, the semantically consistent combination of call types can be found using Boolean formula minimization. FIGS. 4–6 will illustrate the algorithm using the Karnaugh map method for Boolean formula minimization. We will begin by abstracting the call types from this example to A, B and C, where A and B are mutually exclusive. Because A and B are mutually exclusive the resulting formula should not contain A AND B.

FIG. 6 is a flowchart of the algorithm used by the dialog manager for generating the Boolean formula. At step S605, the SLU output and inheritance hierarchy are input. At step S610, a Karnaugh Map is created whose cells each contain a bit string representing the values of the variables for that cell (shown in the shaded region of FIG. 4). At step S615, for all variables that are mutually exclusive (A and B in this example) the transformation $A=B=A \vee B$ is applied. The result of this transformation is shown in the unshaded region of FIG. 4. At step S620, for all unshaded cells of FIG. 4, $X = A \wedge B \wedge C$ is evaluated to yield the 1s and 0s used in the standard Karnaugh Map. At step S625, Boolean formula minimization is performed on X via the Karnaugh Map method as illustrated in FIG. 5. Finally, at step S630, a Boolean formula is output.

If we apply this algorithm on the above example, the output is the Boolean formula (A AND C) OR (B AND C). The dialog manager then uses this formula to determine that it needs to ask clarifying questions.

Figure 7:
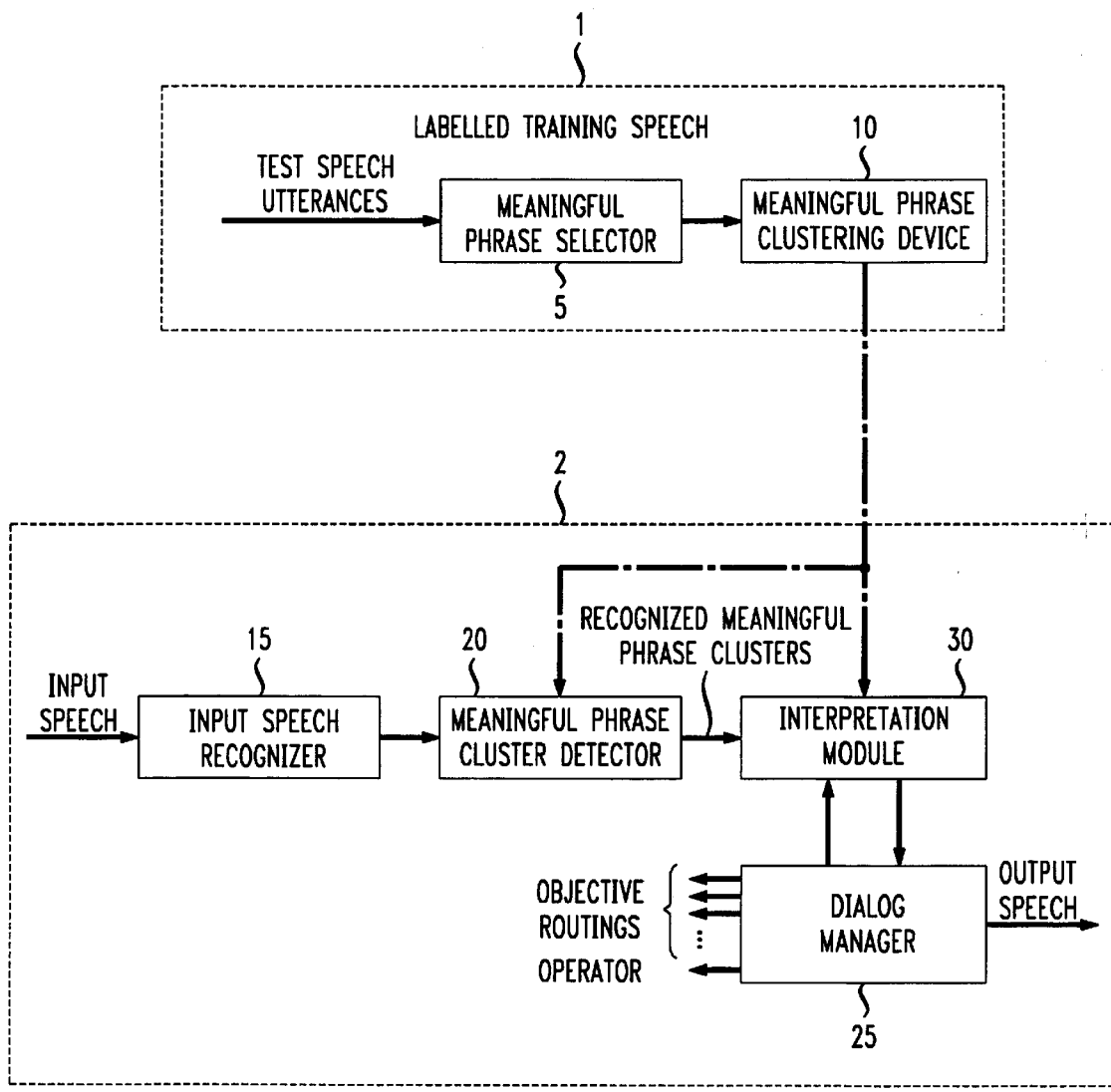
FIG. 7 is a functional block diagram of a system in which the dialog manager of the invention may be employed.

FIG. 7 shows a block diagram of a possible structure in which the dialog manager of the invention may be implemented. As can be seen from the drawing, the structure comprises two related subsystems: Meaningful Phrase Cluster Generation Subsystem 1 and Input Speech Classification Subsystem 2. The Meaningful Phrase Cluster Generation Subsystem 1 operates on a database of a large number of utterances each of which is related to one of a predetermined set of routing objectives, where each such utterance is labeled with its associated routing objective. The operation of this subsystem is essentially carried out by Meaningful Phrase Selector 5 which selects as an output a set of meaningful phrases having a probabilistic relationship with one or more of the set of predetermined routing objectives with which the input speech utterances are associated. The selected meaningful phrases are then input to a Meaningful Phrase Clustering Device 15 that clusters those meaningful phrases which are semantically related. The operation of Meaningful Phrase Selector 5 and the Meaningful Phrase Clustering Device 10 are generally determined in accordance with any known algorithm for selecting and clustering meaningful phrases.

Operation of Input Speech Classification Subsystem 2 begins with the inputting of a user's task objective request, in the caller's natural speech, to Input Speech Recognizer 15. The Input Speech Recognizer 15 may be of any known design and performs the function of recognizing, or spotting, the existence of one or more meaningful phrase in the input speech. A Meaningful Phrase Cluster Detector 20 then detects the meaningful phrase clusters present among the meaningful phrases recognized. As can be seen in the figure, the meaningful phrase clusters developed by Meaningful Phrase Generation Subsystem 1 are provided as an input to Meaningful Phrase Cluster Detector 20 to define the routing objectives related to meaningful phrase clusters and to establish the levels of probability for a relation of such input meaningful phrases clusters to a particular routing objective.

The output of Meaningful Phrase Cluster Detector 20, which will comprise the detected meaningful phrase clusters appearing in the caller's routing objective request, is provided to Interpretation Module 30. The Interpretation Module 30 compiles a list of probable routing objectives based on the probabilistic relation between the recognized meaningful phrase clusters and selected routing objectives. The Interpretation Module 30 then applies a threshold to the list of routing objectives to narrow the list of possibilities. The list is then input to the Dialog Manager 25 where an inheritance hierarchy and Boolean formula are applied in order to form a decision to either to implement the chosen routing objective with an announcement to the caller that such an objective is being implemented (if only one objective is possible), or to seek additional information and/or confirmation from the caller (if none or more than one objective are possible).

Based on caller feedback in response to such an inquiry, the Dialog Manager 25 again applies the inheritance hierarchy and Boolean formula to determine if a decision to implement a particular routing objective is appropriate. This feedback process continues until either a clear decision can be made to implement a particular routing objective or a determination is made that no such decision is likely, in which case the caller is defaulted to an operator position.

Figure 8:
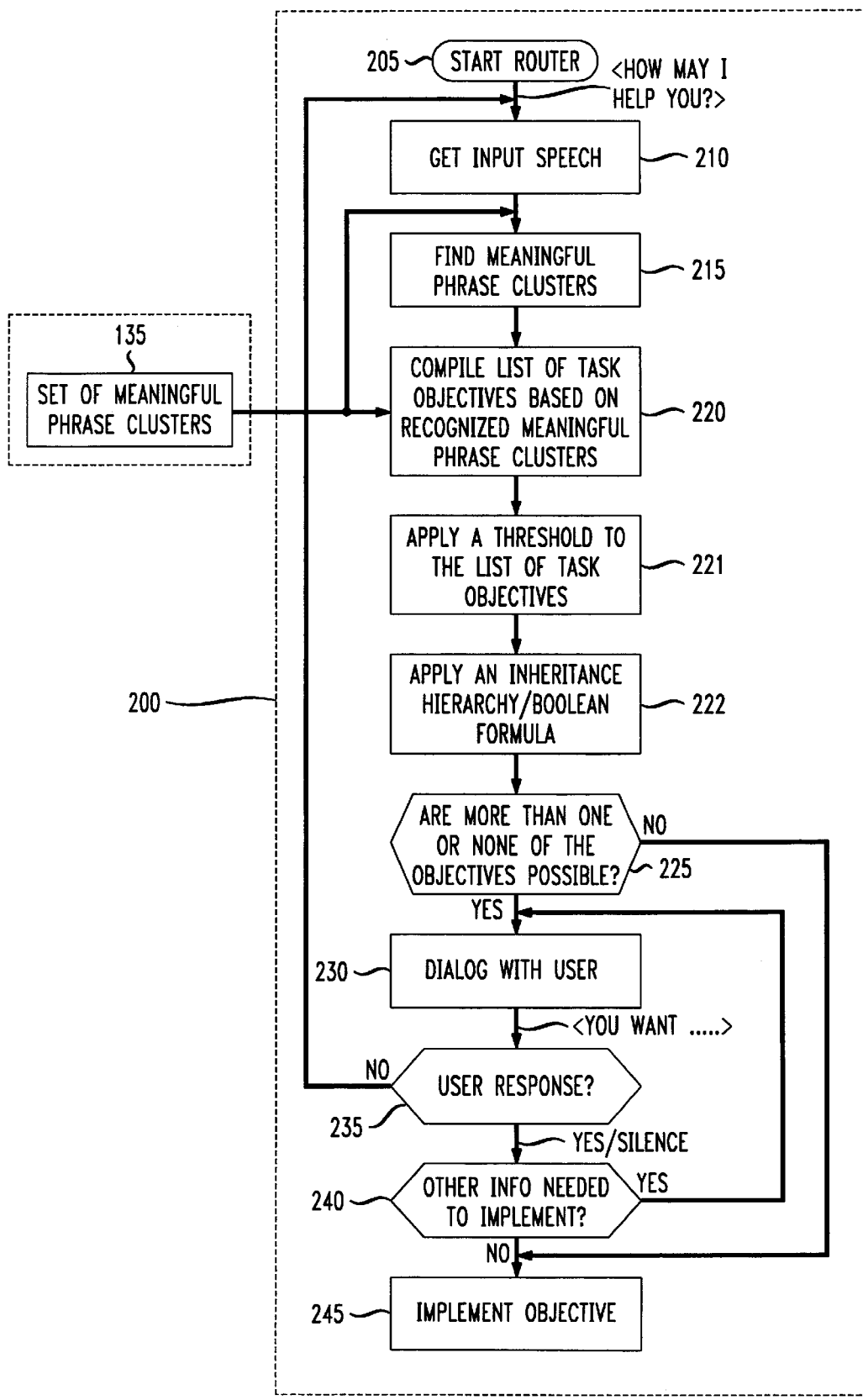
FIG. 8 is a flow diagram depicting the methodology of how the dialog manger of the invention may be employed in accordance with the system depicted in FIG. 7.

FIG. 8 is a flowchart depicting the methodology of the invention. The Automated Call Routing functions begin with step S205 where a caller accessing the router is provided a greeting similar to "How may I help you?" The caller's response to that greeting is obtained at step S210 and that response is examined for the presence of one or more meaningful phrase clusters. As can be seen in the figure, the set of meaningful phrase clusters will have been provided as an input to step S215 as well as step S220.

In step S220, a prioritized list is compiled of task objectives based on the recognized meaningful phrase clusters detected from the caller's input speech. At step S221, a threshold is applied to the list of task objectives to determined if any number of task objectives tied to the user's speech are possible. At step S222, an inheritance hierarchy and Boolean formula are then applied to the list of task objectives to further determine the possible tasks the user wishes to implement. At step S225, from the results or the inheritance hierarchy and Boolean formula, a decision is made as to whether none, one, or more than one objectives are possible to implement. If only one objective is possible and meets the threshold, the objective is implemented at step S245. If none or more than one of the objectives are possible, the Dialog Manager 25 solicits an affirmation from the user or requests additional information as needed, at step S230.

Such dialog will typically begin with a query to the user of the form "You want . . . ?" If the user responds in the negative to such a query, at step S235, the process returns to step S210 with a restatement by the user of its request. A "yes" or silence response from the user moves the process along to step S240, where consideration is given to whether other information is needed to carry out the objective which was not in the input speech—e.g., the number to be credited in the case of a credit request. Where additional information is needed, the process returns to step S230 for additional dialog with the user. If no additional information is required, the objective is implemented at step S245.

This invention presents a method for determining a set of semantically consistent call types. Task knowledge is represented in an inheritance hierarchy and relations (superseding and mutual exclusion) are defined between call types. These relationships govern the generation of the final set of semantically consistent call types. This set is generated using a Boolean formula minimization algorithm. It is this final set of call types that governs the dialog behavior.

Although the present embodiments of the invention have been described in detail, it should be understood that various changes, alterations and substitutions can be made therein without departing from the spirit and scope of the invention as defined by the appended claims.

What is claimed is:

1. A method of interpreting a user's input and implementing one or more task objectives, comprising:
    establishing a hierarchy of task objectives, the hierarchy including a plurality of categories of task objectives, each of the task objectives being assigned a different priority;
    identifying one or more of the task objectives from the user's input;
    determining an order of implementation of the identified task objectives based on the priorities assigned to each of the identified task objectives; and
    implementing the task objectives based on the determined order of implementation.

2. The method of claim 1, further comprising the step of:
    applying a threshold to the identified one or more task objectives, wherein the identified task objectives not meeting the threshold are not implemented.

3. The method of claim 1, wherein at least one of the categories of the hierarchy includes task objectives that are mutually exclusive.

4. The method of claim 3, wherein if mutually exclusive ones of the task objectives are identified, the dialog manager generates a signal indicating dialog should be conducted with the user.

5. The method of claim 1, wherein a different priority is assigned to each of the categories of task objectives.

6. The method of claim 5, wherein the categories of the identified task objectives and an order of implementation of the task objectives, are determined based on the priorities assigned to the identified categories.

7. The method of claim 2, wherein if the threshold is applied to the identified one or more task objectives, and the identified task objectives not meeting the threshold are not immediately implemented, dialog is conducted with the user.

8. The method of claim 7, comprising the further step of:
    identifying one or more of the task objectives from input provided by the user after dialog is conducted.

9. The method of claim 1, wherein the user's input is speech.

10. The method of claim 1, wherein each of the task types have one or more attributes and each attribute is assigned a priority based upon the user's input.

11. A system for interpreting a user's input and interacting with a user in order to implement one or more task objectives, comprising:
    an inheritance hierarchy module that establishes a hierarchy of task objectives, the hierarchy including a plurality of categories of task objectives, each of the task objectives being assigned a different priority;
    an interpretation module that identifies one or more of the task objectives from the user's input; and
    a dialog manager that determines an order of implementation of the identified task objectives based on the priorities assigned to each of the identified task objectives.

12. The system of claim 11, wherein the dialog manager applies a threshold to the identified one or more task objectives, wherein the identified task objectives not meeting the threshold are not immediately implemented.

13. The system of claim 11, wherein at least one of the categories of the hierarchy includes task objectives that are mutually exclusive.

14. The system of claim 13, wherein if the interpretation module identifies mutually exclusive ones of the task objectives, the dialog manager generates a signal indicating dialog should be conducted with the user.

15. The system of claim 11, wherein the inheritance hierarchy module assigns a different priority to each of the categories of task objectives.

16. The system of claim 15, wherein the dialog manager determines the categories of the identified task objectives and determines an order of implementation of the task objectives based on the priorities of the identified categories.

17. The system of claim 12, wherein if the threshold is applied to the identified one or more task objectives, and the identified task objectives not meeting the threshold are not immediately implemented, dialog is conducted with the user.

18. The system of claim 17, wherein after dialog is conducted with the user and the user provides additional input, the user's additional input is then input back into the interpretation module.

19. The system of claim 11, wherein the user's input is speech.

20. The system of claim 19, wherein the interpretation module is a Spoken Language Understanding Module.

21. The system of claim 11, wherein each of the task types have one or more attributes and each attribute is assigned a priority based upon the user's input.

22. A system for interpreting a caller's speech and engaging in conversation with a caller in order to implement one or more call routing objectives, comprising:

an inheritance hierarchy module that establishes a hierarchy of call routing objectives, the hierarchy including a plurality of categories of call routing objectives, each of the call routing objectives being assigned a different priority;

a Spoken Language Understanding Module that identifies one or more of the call routing objectives from the caller's speech; and a dialog manager that determines an order of implementation of the identified call routing objectives on the priorities assigned to each of the identified call routing objectives.

23. The system of claim 22, wherein the dialog manager applies a threshold to the identified one or more call routing objectives, wherein the identified call routing objectives not meeting the threshold are not implemented.

24. The system of claim 22, wherein at least one of the categories of the hierarchy includes call routing objectives that are mutually exclusive.

25. The system of claim 24, wherein if the Spoken Language Understanding Module identifies mutually exclusive ones of the call routing objectives, the dialog manager generates a signal indicating dialog should be conducted with the caller.

26. The system of claim 22, wherein the inheritance hierarchy module assigns a different priority to each of the categories of the call routing objectives.

27. The system of claim 26, wherein the dialog manager determines the categories of the identified call routing objectives and determines an order of implementation of the call routing objectives based on the priorities of the identified categories.

28. The system of claim 23, wherein if the threshold is applied to the identified one or more call routing objectives, and the identified call routing objectives not meeting the threshold are not immediately implemented, dialog is conducted with the caller.

29. The system of claim 28, wherein after dialog is conducted with the caller, the caller's additional speech is then input into the Spoken Language Understanding Module.

30. The system of claim 22, wherein each of the call routing objectives have one or more attributes and each attribute is assigned a priority based upon the caller's speech.

* * * * *